US008203934B2

(12) United States Patent
Savage et al.

(10) Patent No.: US 8,203,934 B2
(45) Date of Patent: Jun. 19, 2012

(54) TRANSPARENT AUTOMATIC PROTECTION SWITCHING FOR A CHASSIS DEPLOYMENT

(75) Inventors: Donnie V. Savage, Raleigh, NC (US);
Alvaro E. Retana, Raleigh, NC (US);
Steven E. Moore, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 1623 days.

(21) Appl. No.: 11/445,584

(22) Filed: Jun. 2, 2006

(65) Prior Publication Data
US 2007/0280103 A1    Dec. 6, 2007

(51) Int. Cl.
*H04J 3/14* (2006.01)
(52) U.S. Cl. ........................... 370/217; 370/224
(58) Field of Classification Search ............ 370/216, 370/242, 401, 228, 217, 219, 372, 244; 398/54; 709/238
See application file for complete search history.

(56) References Cited

U.S. PATENT DOCUMENTS

| | | | | |
|---|---|---|---|---|
| 2002/0009048 A1* | 1/2002 | Hosler et al. | | 370/217 |
| 2003/0067928 A1* | 4/2003 | Gonda | | 370/401 |
| 2003/0161262 A1* | 8/2003 | Hosoi | | 370/228 |
| 2003/0189925 A1* | 10/2003 | Wellbaum et al. | | 370/372 |
| 2004/0208554 A1* | 10/2004 | Wakai et al. | | 398/54 |
| 2005/0041575 A1* | 2/2005 | Kam et al. | | 370/216 |
| 2005/0102423 A1* | 5/2005 | Pelavin et al. | | 709/238 |
| 2006/0203734 A1* | 9/2006 | Esfandiari et al. | | 370/242 |
| 2007/0211622 A1* | 9/2007 | Yamakawa | | 370/217 |
| 2007/0253326 A1* | 11/2007 | Saha et al. | | 370/217 |
| 2009/0059803 A1* | 3/2009 | Phaltankar | | 370/244 |

OTHER PUBLICATIONS

White paper "The multi-router approach to a profitable edge network" by TeleChoice posted on Jan. 21, 2003, p. 1 of 1.*

* cited by examiner

*Primary Examiner* — Kwang B Yao
*Assistant Examiner* — Syed M Bokhari
(74) *Attorney, Agent, or Firm* — P. Su (57) ABSTRACT

Methods and apparatus for allowing a traffic level switch associated with an automatic protection switching (APS) topology to occur transparently and without reconverging routing are described. According to one aspect of the present invention, a method for providing protection switching configuration information associated with a router arrangement to includes identifying a first interface and a second interface of the router arrangement as an APS group. The method also includes providing information regarding the APS group to a process that implements a routing protocol. Providing the information regarding the group includes identifying the first interface as a primary interface and identifying the second interface as a backup interface that is arranged to protect the primary interface.

26 Claims, 8 Drawing Sheets

TRANSPARENT AUTOMATIC PROTECTION SWITCHING FOR A CHASSIS DEPLOYMENT

BACKGROUND OF THE INVENTION

1. Field of Invention

The present invention relates generally to protection switching in optical networks. More particularly, the present invention relates to allowing for a transparent switchover from a primary interface to a backup interface with respect to a multi-router automatic protection switching (APS) in a single chassis associated with an optical network.

2. Description of the Related Art

Automatic protection switching (APS) is a mechanism that is used for network survivability on synchronous optical transport network (SONET) networks in the event of a failure on a network element or a link. APS provides for a failover of traffic from a working link to a dedicated protection link when there is a failure of the working link. Multiplexed switching protection (MSP) is a substantially equivalent mechanism to APS, and is used in synchronous digital hierarchy (SDH) networks. APS schemes generally reserve a protection or backup channel with the same capacity as a working or primary channel that is to be protected. By way of example, APS uses a primary interface to carry traffic and a backup interface to switch over to as a standby interface in the event of failures associated with the primary interface.

Figure 1A:
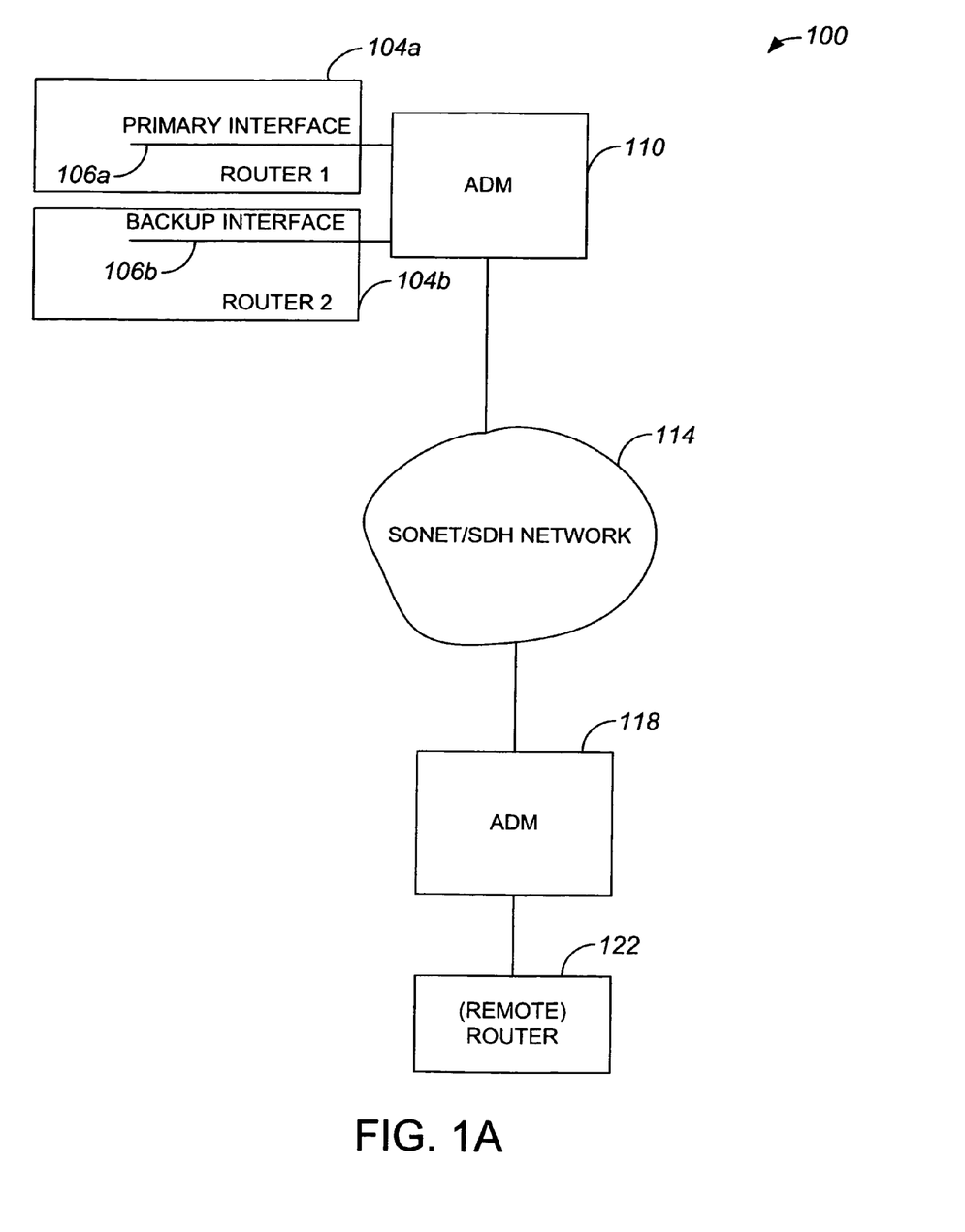
FIG. 1A is a diagrammatic representation of a system that includes an automatic protection switching (APS) topology with a plurality of routers on separate chassis.

Typically, APS is a feature that is offered in high-end routers, and may be used by customers to provide circuit-level protection for expensive, high bandwidth circuits. APS may be implemented using multiple routers on different chassis, or using multiple routers on a single chassis. FIG. 1A is a block diagram representation of a system in which multiple routers on different chassis are used to implement an APS topology. In a system 100, a first router 104a is associated with a primary interface 106a. A backup interface 106b of a second router 104b is arranged to serve as a standby to primary interface 106a. An add-drop multiplexer (ADM) 110 receives traffic on both primary interface 106a and backup interface 106b. In general, during protection switching, ADM 110 signals back and forth with both first router 104a and second router 104b using K1 and K2 line overhead bytes in SONET frames, or equivalent line overhead bytes of SDH frames, to indicate the nature and priority of a switch request. Utilizing values stored in K1 and K2 bytes in line overhead, ADM 110 determines whether to use the traffic received on primary interface 106a or the traffic received on backup interface 106b. As will be appreciated by those skilled in the art, the default condition when neither primary interface 106a nor backup interface 106b has failed is to use traffic obtained from primary interface 106a. ADM 110 forwards traffic obtained on one interface 106a, 106b, and discards any traffic obtained on the other interface 106a, 106b.

ADM 110 forwards traffic received on one of interface 106a, 106b through a SONET network 114 towards an intended destination. Network 114, though described as being a SONET network, may instead be an SDH network. The traffic is provided network 114 to an ADM 118 associated with a destination, or remove, router 122.

Traffic originating at router 122 may be sent via ADM 118, through SONET network 114, to ADM 110 and, hence, to primary interface 106a and backup interface 106b. In general, any traffic received by ADM 110 from network 114 is forwarded from ADM 110 on both primary interface 106a and backup interface 106b.

Figure 1B:
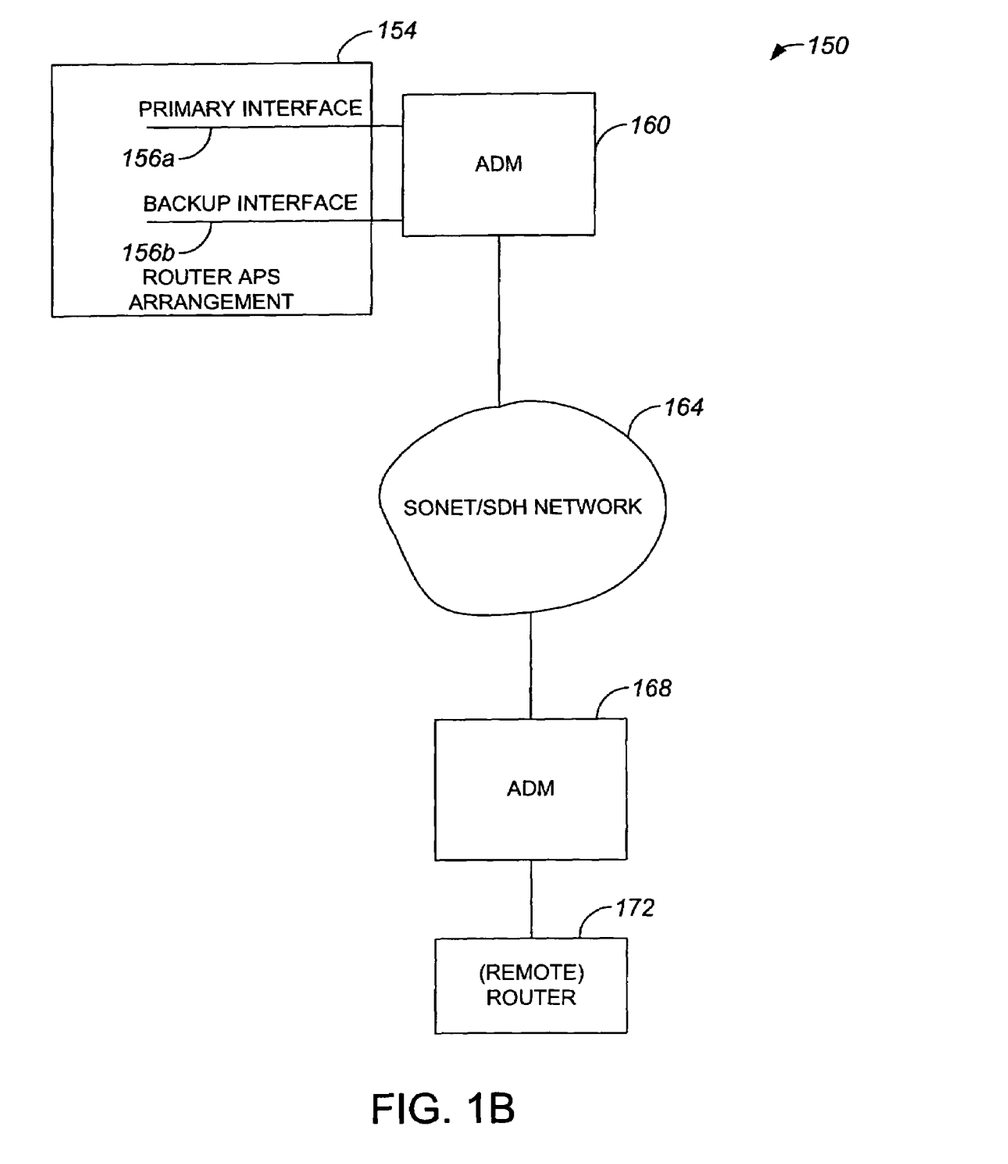
FIG. 1B is a diagrammatic representation of a system that includes an APS topology with a plurality of routers on a shared chassis.

Having first router 104a and second router 104b on separate chassis provides chassis-level protection in the event of a failure of an overall chassis. However, multiple routers may also be implemented on a shared chassis. FIG. 1B is a block diagram representation of a system in which multiple routers, e.g., a router implementing a primary interface and a router implementing a backup interface, on a singlechassis are used to implement an APS topology. In a system 150, a router arrangement 154 that has an APS topology includes both a primary interface 156a and a backup interface 156b that are in communication with an ADM 160. ADM 160, using K1 and K2 bytes of packets contained in traffic received on primary interface 156a and backup interface 156b, identifies which interface 156a, 156b is suitable for use in obtaining traffic to be forwarded through a SONET network 164 to an ADM 168 and a remote router 172.

Traffic that is received by ADM 160 from SONET network 164 is placed by ADM 160 on both primary interface 156a and backup interface 156b. Router arrangement 154 then determines whether to use the traffic obtained via primary interface 156a or the traffic obtained via backup interface 156b.

In either system 100 of FIG. 1A or system 150 of FIG. 1B, when a primary interface fails, a switch is made to an associated backup interface. Such a switch may be indicated in K1 and K2 bytes to provide components of a system, as for example ADMs, with information that indicates that a backup interface is to be used to receive and to forward traffic. Using information stored in K1 and K2 bytes, an ADM is informed that a switch from a primary interface to a backup interface should be made. The amount of time within which the switch is expected to occur is typically specified by standards as a time required to detect and to perform a protection switch.

When a circuit level switch is made from a primary interface to a backup interface, the switch is specified as having to occur within an approximately 50 millisecond (ms) time interval. However, such a switch typically does not include actually switching traffic from the primary interface to the backup interface. In other words, a switchover may effectively occur relative to layer 1 of an Open Systems Interconnection (OSI) reference model standard within approximately 50 ms, but a switchover that occurs relative to layer 3 of the OSI reference model standard typically takes much longer than 50 ms. That is, the layer 3 switchover, or a routing or forwarding convergence, takes longer than 50 ms and is not included in SONET specification for a 50 ms switchover timeframe.

A device which implements a routing protocol generally resets the routing protocol when it is determined that a primary interface is no longer being used. As will be appreciated by those skilled in the art, a routing protocol is the language a router "speaks" with other routers in order to share information about the reachability and status of a network. When a routing protocol is reset in the event of a topology change, e.g., in the event of a determination that a primary interface is no longer usable, a fairly significant amount of time may elapse as a result of a resetting or reconverging process. As a result of a routing protocol being reset, traffic may often be dropped or otherwise lost during a switchover relative to layer 3.

Figure 2:
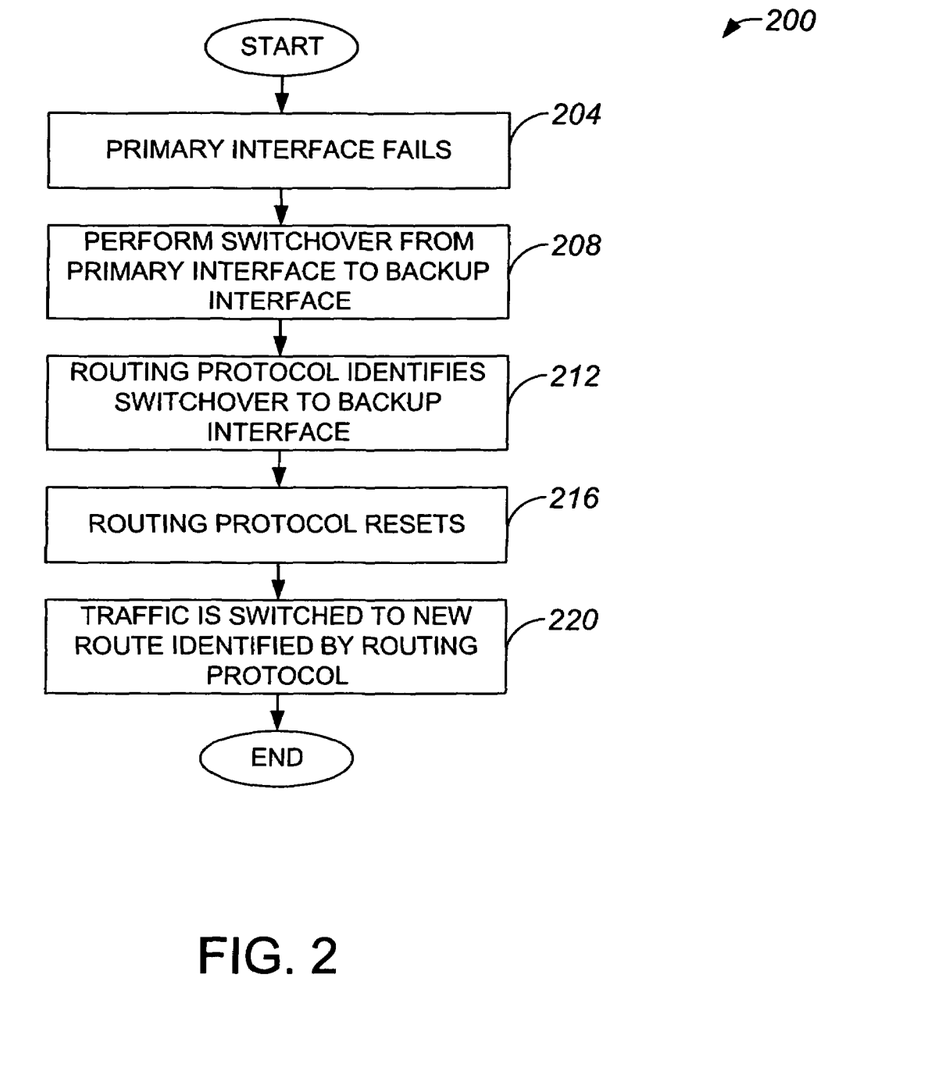
FIG. 2 is a process flow diagram which illustrates one method of performing an overall switchover in a system with an APS topology.

With reference to FIG. 2, one method is shown of switching traffic from using a path associated with a primary interface to a different path, e.g., a path associated with a backup interface. A process 200 of switching from a primary path to a backup path begins at step 204 in which a primary interface fails. It should be appreciated that a failure of a primary interface may generally be a failure that has an affect on the primary interface. Once the primary interface fails, a switchover from the primary interface to an associated backup interface is performed in step 208. Such a switchover generally involves a circuit level switch from the primary interface to the backup interface.

After the circuit level switchover is performed, a process that embodies a routing protocol identifies the switchover to the backup interface in step 212. The routing protocol, which may be an interior gateway protocol (IGP) such as an enhanced interior gateway routing protocol (EIGRP) embodied as a process, identifies the switchover when the routing protocol determines that it is no longer communicating using the primary interface. IGP is a protocol for exchanging routing information between gateways within an autonomous network that may be used by internet protocol (IP) or other network protocols to specify how to route traffic. Open shortest path first (OSPF) and IS-IS are examples of an IGP. EIGRP, or a process that embodies EIGRP, notifies nodes within a network of topology changes in a system by transmitting substantially only the change, as opposed to an entire topology table. Each router using EIGRP is aware of the state of each of its neighbors, notifies each neighbor of changes in topology. EIGRP typically uses a diffusing-update algorithm (DUAL) to identify whether a path is looped or loop-free, and to identify a most efficient route to a particular destination.

The routing protocol effectively resets itself in step 216 after the switchover is identified in step 212. Resetting a routing protocol generally involves reconverging a network in the event of a topology change such as the failure of a primary interface. From step 216, process flow moves to step 220 in which traffic is switched to a new route identified by the routing protocol. As previously mentioned, switching traffic to a new route typically results in a loss of some traffic because of the downtime in a network associated with the resetting or reconverging process. Once the traffic is switched, the process of switching traffic from a primary interface is completed.

The loss of some packets contained in traffic when a process that implements a routing protocol reconverges a network prior to a traffic level switchover is often considered to be unacceptable, particularly when the network is used to transmit data traffic. Even though a circuit level switchover from a primary interface to a backup interface may be relatively fast, e.g., may occur in less than approximately 50 ms, from a layer 3 perspective, the traffic level switchover occurs much more slowly due to downtime associated with reconverging the network and causes some traffic to be lost. The downtime and the loss of traffic may be highly detrimental, e.g., loss of traffic associated with applications is highly undesirable.

Therefore, what is needed is a method and an apparatus for efficiently switching traffic from a primary interface to a backup interface in a multi-router APS implementation, without a significant loss of traffic when the primary interface fails. That is, what is desired is a system which allows for a transparent switchover to occur relative to layer 3 in a system which utilizes multi-router APS implemented on a shared chassis.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In many synchronous optical network (SONET) and synchronous digital hierarchy (SDH) networks, circuit-level and traffic level protection are both desired. In SONET networks, automatic protection switching (APS) is implemented to provide protection. APS generally utilizes a primary interface to carry traffic and a backup or protect interface to serve as a "standby" which may be switched to in the event of a failure of the primary interface. While a circuit level switchover from a primary interface to a backup interface may occur relatively quickly, e.g., in under approximately 50 milliseconds (ms), a traffic level switch generally takes longer due to the need for a routing protocol to reconverge routing in an overall network in response to the circuit level switchover. Hence, although a circuit level switchover may occur within a specified time limit, e.g., a time limit specified in bytes of line overhead of a packet, a traffic level switchover generally fails to be completed within the specified time limit.

During a protection switch in a network with router arrangements that have an APS topology, a router arrangement may communicate with an add/drop multiplexer (ADM) using K1 and K2 line overhead bytes of frames. By communicating using K1 and K2 line overhead bytes, the router arrangement and the ADM are each informed that a circuit level switch from a primary router interface to a backup router interface in a shared chassis should occur, and the amount of time within which the switch should occur. If both the primary router interface and the backup router interface are aware that the primary router interface and the backup router interface are paired, or associated with a shared chassis, then a traffic level switch may occur without reconverging the network as a part of a protection switch. As a remote router, e.g., a router at a far end of a circuit or a path relative to the router arrangement, is unaware of when a switch from the primary router interface to the backup router interface occurs, it is possible to allow traffic to be switched transparently relative to layer 3 of an Open Systems Interconnect (OSI) reference model standard.

By propagating information associated with a primary interface and its associated backup interface to a process that implements a routing protocol when both interfaces are on a shared chassis, the routing protocol is effectively notified that when a primary interface is not in use, the associated backup interface should be in use. As the process that implements a routing protocol is aware that the primary interface and the backup interface are associated with the same path, the process that implements the routing protocol does not need to recalculate or reconverge a network when a circuit level switchover is made from the primary interface to the backup interface. Hence, traffic may generally be switched from the primary interface to the backup interface without a significant delay and without a significant loss of traffic, i.e., a layer 3 transparent switchover may occur.

In one embodiment, the process which implements a routing protocol that is provided with information relating to a paired primary interface and backup interface is a process which implement an enhanced interior gateway routing protocol (EIGRP). Informing an EIGRP protocol, i.e., informing processes that embody or implement the EIGRP protocol, that a primary interface and a backup interface are paired may involve utilizing an "APS group" command. If a process that embodies the EIGRP protocol is aware that a primary interface and a backup interface are in the same group, then the process knows that the interfaces are paired for protection, i.e., are essentially part of the same path. When the process that embodies the EIGRP protocol is informed that a circuit level switch has occurred, the process continues to operate such that the EIGRP protocol avoids dropping an adjacency, i.e., a neighbor relationship between elements, and to update next-hop information to reflect the circuit level switch. The process that embodies the EIGRP protocol identifies interfaces within a chassis which are configured for APS, and maintains a peering relationship with a neighboring router such that transparent forwarding of traffic is provided during a protection switch event. Hence, rather than effectively taking protective measures, the process that embodies the EIGRP protocol continues to operate by using the newly activated backup interface to send and to receive data, rather than the primary interface.

Figure 3:
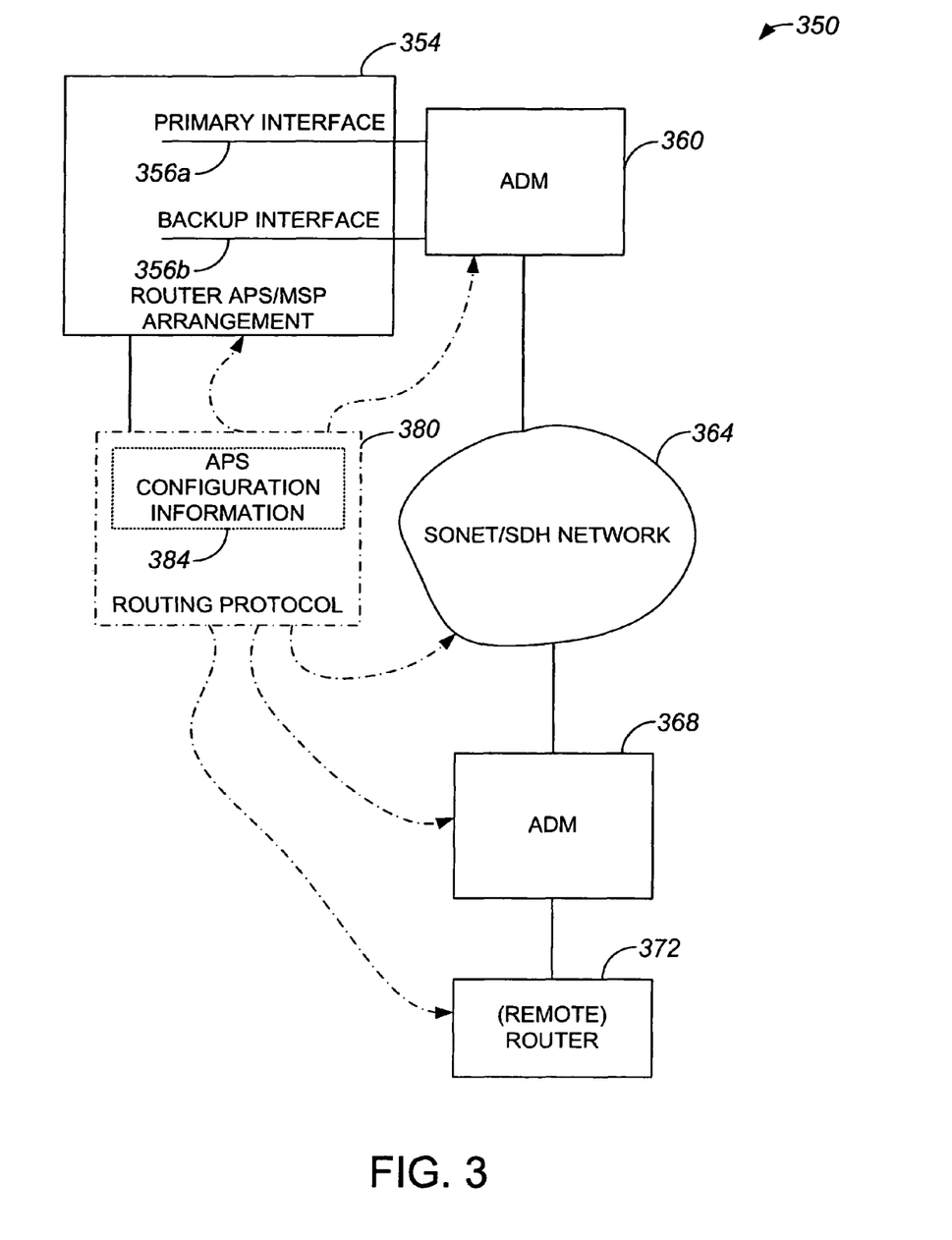
FIG. 3 is a diagrammatic representation of a system that includes an APS topology with a plurality of routers on a shared chassis in which configuration information associated with the plurality of routers is provided to a routing protocol in accordance with an embodiment of the present invention.

APS configuration information that includes APS group information for interfaces on a shared chassis may be provided to a process that embodies routing protocol such as an EIGRP protocol. FIG. 3 is a diagrammatic representation of a system that includes an APS topology with a plurality of routers on a shared chassis in which configuration information associated with the plurality of routers is provided to a routing protocol in accordance with an embodiment of the present invention. A system 350 includes a shared, multi-router chassis 354 with an APS topology. It should be appreciated that although a protection switching topology such as APS is described, other protection switching topologies, e.g., a multiplexed switching protection (MSP) topology, may instead be associated with multi-router chassis 354.

When a primary interface 356a and a backup interface 356b are paired, as for example using an APS group command, information related to the pairing is provided as APS configuration information 384 to an operating system memory (not shown) associated with chassis 354. Information that allows a routing protocol 380 to be implemented within system 350 is also provided in the operating system memory (not shown). An APS group command will be described below with respect to FIGS. 4A and 4B. Routing protocol 380, which may be an IGP such as EIGRP, is effectively made aware through APS configuration information 384 that in the event that primary interface 356a fails, backup interface 356b is to be used in a path in lieu of primary interface 356a. For example, a process that runs routing protocol 380 would obtain APS configuration information 384 during configuration or activation of routing protocol 380. Hence, when a circuit level switch from primary interface 356a to backup interface 356b occurs, without dropping a connection and reconverging the system 350, processes that implement routing protocol 380 may cause a transparent traffic level switch, or a layer 3 switch, from primary interface 356a to backup interface 356b.

Information in routing protocol 380 is effectively provided to ADM 360 when routing protocol 380 is configured. Although such information may traverse a SONET/SDH network 364 to reach an ADM 368 and a remote router 372 that is an endpoint of a path that also includes multi-router chassis 354, it should be appreciated that such information may instead only be local to multi-router chassis 354. In other words, ADM 360 may be aware of the information in routing protocol 380 while other elements in system 350 are not.

When APS is configured on a chassis, e.g., a router associated with a chassis, such as chassis 354 of FIG. 3, configuration information including the grouping of interfaces is typically registered internally within an operating system memory associated with the chassis. An APS process is responsible for registering the configuration information, and stores the configuration information into a known location within the internal infrastructure of software associated with the router. A process that runs an implementation of EIGRP may search for the information stored in the known location for appropriate interfaces during configuration or activation of EIGRP relative to the appropriate interfaces. Hence, a process that implements EIGRP may effectively be informed of a pairing of interfaces by searching an internal registry associated with an interface, and may take appropriate measures based on whether a pairing of interfaces is present or absent.

Figure 4A:
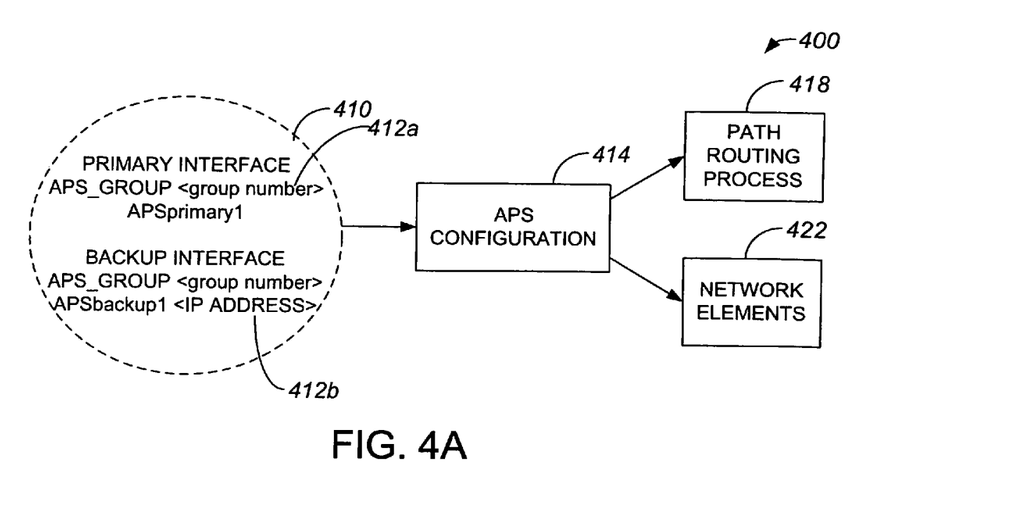
FIG. 4A is a block diagram representation of utilizing APS group commands as inputs to an APS configuration that is provided to a path routing process in accordance with an embodiment of the present invention.

Referring to FIG. 4A, the use of an APS group command as an input to an APS configuration that is provided to a path routing process will be described in accordance with an embodiment of the present invention. Within a system 400, an APS configuration 414 may effectively be updated using configuration commands 410. That is, information relating to a primary or working interface and an associated backup or protect interface may be provided to APS configuration 414 using commands 410. In one embodiment, commands 410 include commands 412a associated with a primary interface and commands associated with a backup interface 412b to be specified such that an IP address of a chassis that contains a primary interface and a backup interface (not shown) is entered. A name of the overall APS group specified in APS group commands associated with primary interface commands 412a and backup interface commands 412b identify a name for the primary interface and backup interface pair. Primary interface commands 412a also specify an APSprimary1 command, while backup interface commands 412b specify an APSbackup1 command with the IP address of the chassis.

APS configuration 414 is provided to process that implements a path routing process 418, as for example an IP routing protocol, and to network elements 422 associated with system 400. By providing APS configuration 414 to a process that implements path routing process 418, the process that implements path routing process 418 is informed that the interfaces specified in commands 410 are paired.

Figure 4B:
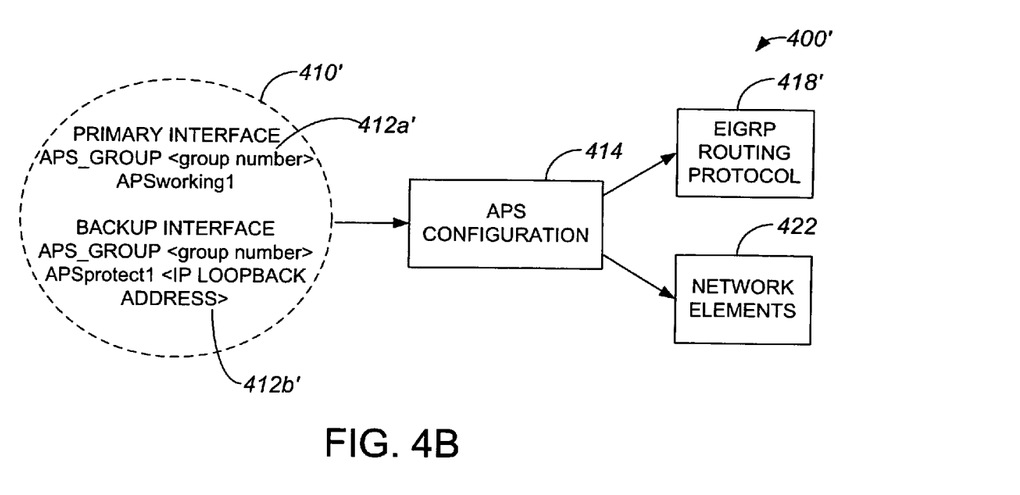
FIG. 4B is a block diagram representation of utilizing APS group commands as inputs to an APS configuration that is provided to an enhanced internal gateway routing protocol (EIGRP) routing protocol in accordance with an embodiment of the present invention.

In one embodiment, a process that implements path routing process 418 may be associated with a process that implements an EIGRP routing protocol. FIG. 4B is a block diagram representation of APS group commands, e.g., APS group commands include in commands 410 of FIG. 4A, that is used to provide information about a pair of interfaces to a process that implements an EIGRP routing protocol in accordance with an embodiment of the present invention. A system 400' allows APS configuration 414 to be updated by commands 410' which may identify a group that includes a working router interface (not shown) as specified by an primary interface commands 412a' and a protect router interface (not shown) with an IP loopback address as specified by an backup commands 412b'. It should be appreciated that the IP loopback address is the same for both the primary router interface (not shown) and the backup router interface (not shown), as it is the IP loopback address for a chassis that contains a backup or protect interface. As will be appreciated by those skilled in the art, an EIGRP routing protocol uses loop-free paths.

A loopback interface is a virtual entity which substantially always maintains an active state, unlike real interfaces which may either be active or inactive. As long as other interfaces on a router are active, and an associated routing protocol is operational, a loopback interface is considered to be reachable. Hence, a loopback interface with an IP loopback address may be used for resiliency.

APS configuration 414 is provided to network elements 422 and to a process that embodies an EIGRP routing protocol 418'. Using APS configuration 414, the process that embodies EIGRP routing protocol 418' may ascertain via an IP address configured in APS configuration commands that the primary and backup interfaces for a specific APS group exist within the same chassis. Therefore, the process that embodies the EIGRP routing protocol 418' may associate the primary and backup interfaces together, and treat both interfaces as the same path in a network. By way of example, if the process that embodies the EIGRP routing protocol 418' ascertains that if a group name is the same for two interfaces, then the two interfaces are paired as a primary interface and a backup interface. The configuration of an APS group using command 410' effectively provides the process that embodies EIGRP routing protocol 418' with knowledge that the interface pair defied by the APS group connect to the same remote neighbor. In one embodiment, if a circuit level switchover from a primary interface to a backup interface is substantially guaranteed to occur within a specified amount of time, e.g., approximately 50 ms, because the process that embodies EIGRP routing protocol 418' generally has reliable delivery of information, a traffic level switchover may occur at approximately the same time as the circuit level switchover.

Figure 5:
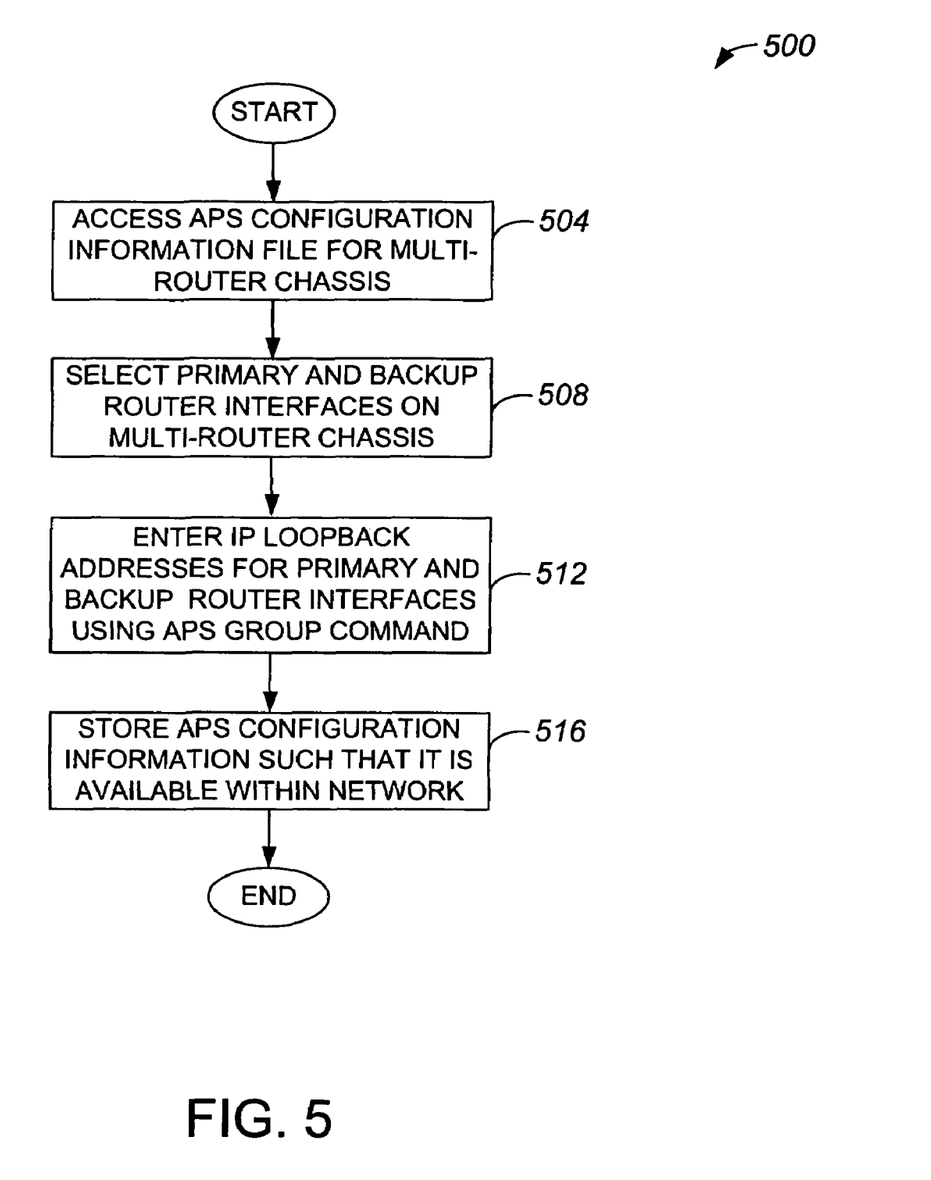
FIG. 5 is a process flow diagram which illustrates one method of creating APS configuration information in accordance with an embodiment of the present invention.

With reference to FIG. 5, one method of providing information that identifies a primary router interface and a backup router interface will be described in accordance with an embodiment of the present invention. A method 500 of providing information that relating to a router configuration begins at step 504 in which an APS configuration information file on a multi-router chassis, e.g., a multi-router APS arrangement on a single chassis, is accessed. After the APS configuration information file is accessed, primary and backup router interfaces on the multi-router chassis are selected or otherwise identified in step 508.

Once a primary router interface and a backup router interface are selected, IP loopback addresses are entered into the APS configuration information file in step 512 for the primary router interface and the backup router interface. In one embodiment, the IP loopback address associated with the primary router interface and the backup router interface is entered using an APS group command as described above with respect to FIG. 4B. A primary router interface may be provided using an APS primary command and a backup router interface may be provided using an APS backup command.

In step 516, the APS configuration information entered in step 512 is stored such that it may be made available substantially within a network, i.e., a network that includes the multi-router chassis. Making the APS configuration information available involves providing a process or device that implements a routing protocol, e.g., an EIGRP protocol, with the APS configuration information to elements in a network. Upon propagating the APS configuration information throughout the network, the process of providing information relative to a router configuration is completed.

Figure 6:
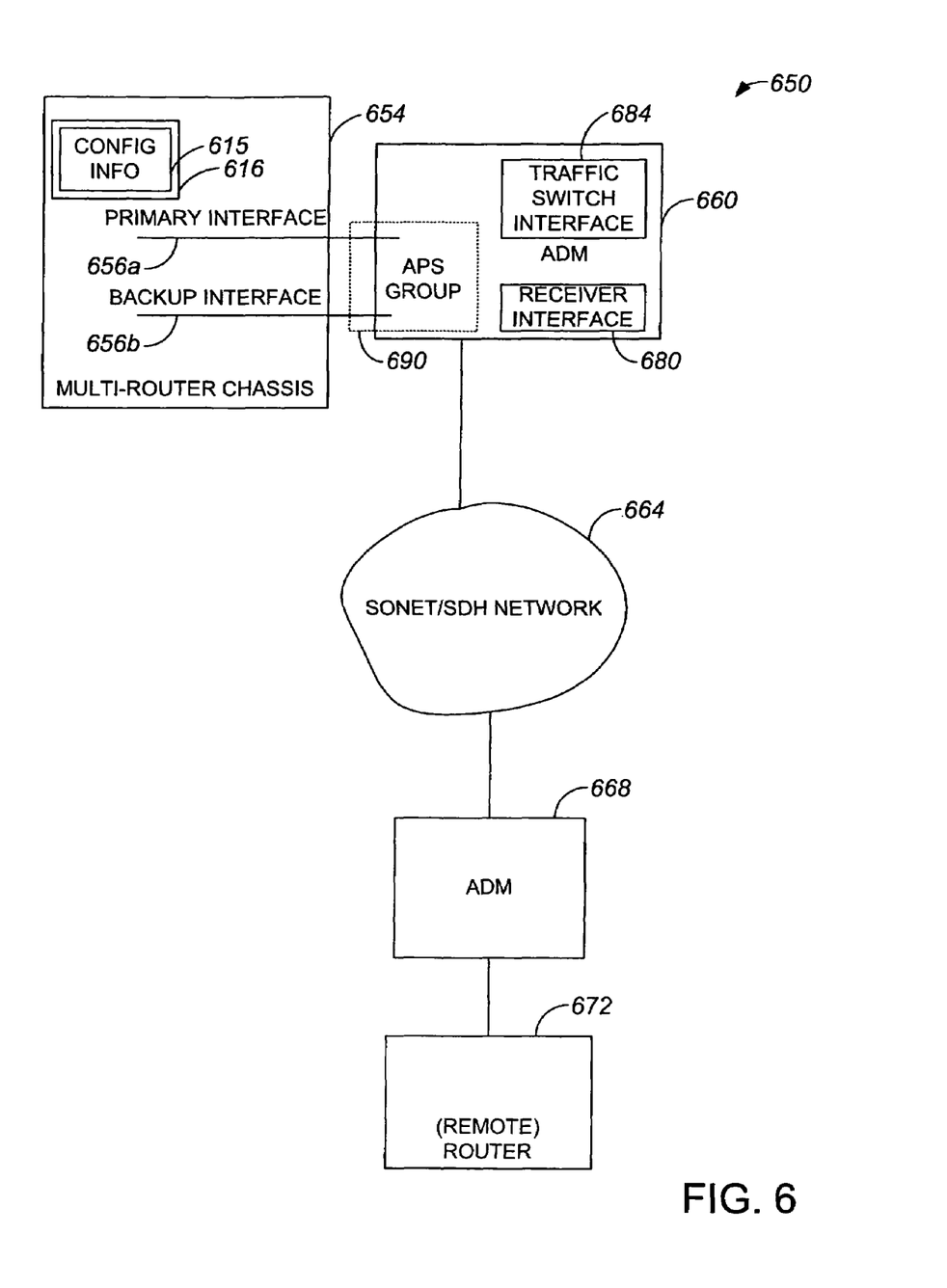
FIG. 6 is a diagrammatic representation of a system that includes a multi-router chassis and a remote router in which configuration information associated with the multi-router chassis provides APS group information in accordance with an embodiment of the present invention.

Information relating to a primary router interface and its associated backup router interface is provided to a routing protocol such that the primary router interface and the backup router interface may effectively connect to the same neighbor. FIG. 6 is a diagrammatic representation of a system that includes a multi-router chassis and a remote router in which configuration information associated with the multi-router chassis provides APS group information in accordance with an embodiment of the present invention. A system 650 includes a multi-router chassis 654 with an APS topology. APS configuration information 615, which generally identifies primary interface 656a as being an active working interface and backup interface 656b as being a backup for primary interface 656a, is present on multi-router chassis 654. APS configuration information 615 is also provided to a process or a device that implements a routing protocol (not shown) using an APS group command such that when a switch from primary interface 656a to backup interface 656b is needed, an ADM 660 effectively has knowledge of an APS group 690 that includes primary interface 656a and backup interface 656b. APS configuration information 615 may be stored in an internal registry 616 or memory area associated with chassis 654. ADM 660 may receive information associated with APS group 690 on a receiver interface 680, and effectively switch between interfaces in APS group 690 using a traffic switching interface 684. It should be understood that from the perspective of a process or a device that implements a EIGRP or routing protocol, effectively treating primary interface 656a and backup interface 656b substantially the same is allowed because primary interface 656a and backup interface 656b are effectively the same router From the point of view of a SONET/SDH network 664, an ADM 668, and a router 672, data passing to chassis 654 and out of chassis 654 is passed using APS group 690. Whether primary interface 656a or backup interface 656b is actually used may be indicated at a SONET level, for instance, using K1 and K2 bytes in line overhead to indicate which of primary interface 656a and backup interface 656b is active and which is inactive. It should be appreciated that although APS configuration information 615, e.g., APS group commands and EIGRP configuration information, is generally not stored on anywhere except in chassis 654 within system 650, other components, may be arranged to store configuration information in one embodiment.

Figure 7:
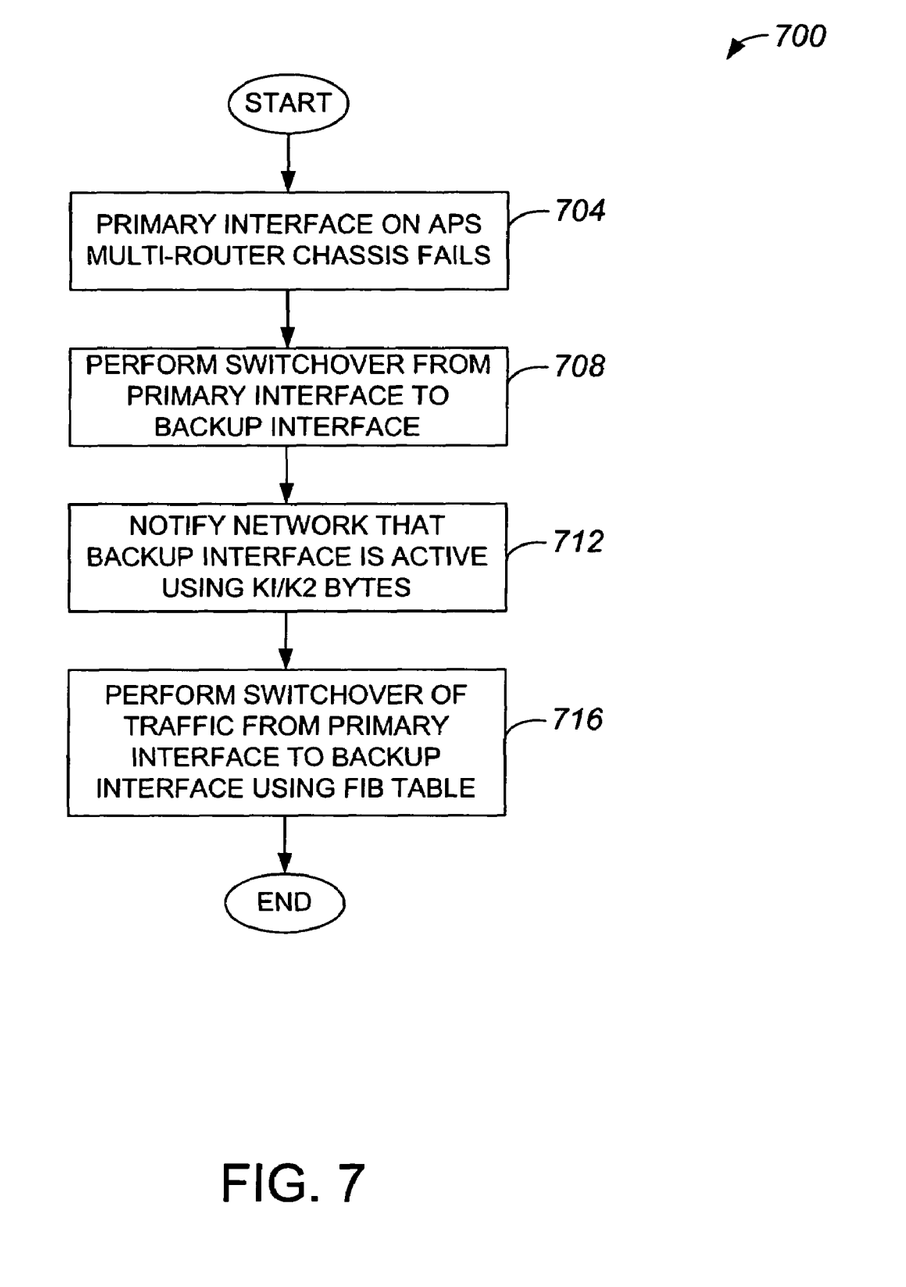
FIG. 7 is a process flow diagram which illustrates one method of responding to a failure of a primary interface in a system that includes an APS topology with a plurality of routers on a shared chassis in accordance with an embodiment of the present invention.

Referring next to FIG. 7, one method of responding to a failure of a primary or active working interface will be described in accordance with an embodiment of the present invention. A method 700 of responding to a failure of a primary interface begins at step 704 in which a primary interface on a multi-router chassis fails. When the primary interface fails, a circuit-level switchover is performed from the primary interface to an associated backup interface in step 708. After the switchover to the backup interface occurs, a network, i.e., a network of which the multi-router chassis is a part, is notified that the backup interface is active in step 712. Such a notification may occur by setting K1 and K2 bytes from a line overhead section of a SONET or SDH frame. In one embodiment, a notification that the backup interface is active may cause a routing protocol to initiate a protection mechanism to avoid dropping adjacencies and to modify next-hop information in a routing table.

Once the network is provided with notification that a backup interface is active, a traffic level switchover is performed to move traffic from the failed primary interface to the backup, or now working, interface in step 716. Such a switchover is typically transparent, i.e., is layer 3 transparent and does not generally involve adjacency resets, as the APS configuration information provided to a routing protocol effectively eliminates the need to reconverge routing. Hence, such a transparent switchover may occur in approximately the amount of time needed to switch from the primary interface to the backup interface. In other words, the transparent switchover, i.e., the layer 3 switch, of traffic to the backup interface occurs substantially when the switch, i.e., the layer 1 switch, from the primary interface to the backup interface is made.

When a switchover is performed from one interface to another, a routing protocol typically does not reset any adjacencies, in accordance with the present invention. Further, a forwarding engine associated with a chassis may be transparently redirected to a backup interface using any suitable mechanism. In one embodiment, performing the switchover of traffic may involve updating and using a forwarding information base (FIB) table.

Although only a few embodiments of the present invention have been described, it should be understood that the present invention may be embodied in many other specific forms without departing from the spirit or the scope of the present invention. By way of example, the present invention has generally been described in terms of an EIGRP routing protocol. However, a transparent switchover relative to layer 3 may generally be implemented using any suitable routing protocol such as a suitable packet over SONET (POS) protocol. In other words, the signaling associated with the present invention, i.e., the ability to provide a process that embodies a routing protocol with information relating to a paired primary router interface and backup router interface, may be applied to any suitable routing protocol. Suitable routing protocols may include, but are not limited to, routing protocols used in systems with interface-dependent adjacencies.

While a transparent traffic level switchover has generally been described with respect to a SONET network, a transparent switchover may occur with respect to an SDH network. That is, in addition to be suitable for use with respect to APS in a SONET network, the present invention is suitable for use with respect to MSP in a SDH network.

In one embodiment, the functionality associated with a process which implements a EIGRP routing protocol that has the capability of performing a transparent traffic level switchover may be used to verify that the routers on opposite ends of a circuit have not changed during the switchover and are still the same devices as prior to the switchover. That is, the EIGRP protocol functionality that allows for the comparison of router identifiers, e.g., router-ids, may be used to identify the routers on opposite ends of a circuit.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method for providing protection switching configuration information associated with a router arrangement to elements of a network, the router arrangement having a protection switching topology, the method comprising: identifying a first interface and a second interface of the router arrangement as an automatic protection switching (APS) group; providing information regarding the APS group to a process that implements a routing protocol, wherein providing the information regarding the APS group includes identifying the first interface as a primary interface and identifying the second interface as a backup interface that is arranged to protect the primary interface, and wherein the information regarding the APS group further includes an IP loopback address associated with the second interface; and performing a traffic level switch from the first interface onto the second interface without causing a process that implements an interior gateway routing protocol (IGP) to reconverge routing.

2. The method of claim 1 wherein the protection switching topology is a multiplexed switching protection (MSP) topology.

3. The method of claim 1 wherein the protection switching topology is an APS topology.

4. The method of claim 3 wherein the routing protocol is an enhanced interior gateway routing protocol (EIGRP).

5. A system for providing protection switching configuration information associated with a router arrangement to elements associated with a network, the router arrangement having a protection switching topology, the system comprising: means for identifying a first interface and a second interface of the router arrangement as an automatic protection switching (APS) group; means for providing information regarding the APS group to a process that implements a routing protocol, wherein the means for providing the information regarding the APS group include means for identifying the first interface as a primary interface and means for identifying the second interface as a backup interface that is arranged to protect the primary interface, and wherein the information regarding the APS group further includes an IP loopback address associated with the second interface; and means for performing a traffic level switch from the first interface onto the second interface without causing a process that implements an interior gateway routing protocol (IGP) to reconverge routing.

6. The system of claim 5 wherein the protection switching topology is an APS topology, the routing protocol is an enhanced interior gateway routing protocol (EIGRP).

7. A method for performing a switchover from a first interface to a second interface, the first interface and the second interface being associated with a router arrangement, the router arrangement having a protection switching topology, the method comprising: identifying if a circuit level switch from the first interface to the second interface has occurred; and performing a traffic level switch from the first interface to the second interface if it is identified that the circuit level switch from the first interface to the second interface has occurred, wherein performing the traffic level switch includes automatically switching traffic arranged to be forwarded using the first interface onto the second interface without causing a process that implements an interior gateway routing protocol (IGP) to reconverge routing, and wherein the first interface is a primary interface and the second interface is a backup interface, the second interface having an associated IP loopback address.

8. The method of claim 7 wherein the router arrangement is a multi-router chassis having a first router and a second router, the first interface being associated with the first router and the second interface being associated with the second router.

9. The method of claim 7 wherein the protection switching topology is an automatic protection switching (APS) topology, and performing the traffic level switch from the first interface to the second interface includes: identifying an APS group that includes the first interface and the second interface, information associated with the APS group being provided by the IGP, wherein the first interface is identified as the primary interface in the APS group and the second interface is identified as the backup interface in the APS group.

10. The method of claim 9 wherein the IGP is an enhanced interior gateway routing protocol (EIGRP).

11. The method of claim 9 wherein identifying if the circuit level switch from the first interface to the second interface has occurred includes:
receiving notification that the circuit level switch has occurred, wherein the notification is received in line overhead bytes of a data packet.

12. The method of claim 7 further including:
identifying the first interface and the second interface as being paired and associated with a shared path before identifying if the circuit level switch from the first interface and the second interface has occurred.

13. The method of claim 12 wherein identifying the first interface and the second interface as being paired includes obtaining automatic protection switching (APS) configuration information that identifies the first interface and the second interface as being paired.

14. The method of claim 13 wherein performing the traffic level switch includes performing a layer 3 transparent switchover.

15. A system arranged to perform a switchover from a first interface to a second interface, the first interface and the second interface being associated with a router arrangement, the router arrangement having an automatic protection switching (APS) topology, the system comprising: means for identifying if a circuit level switch from the first interface to the second interface has occurred; and means for performing a traffic level switch from the first interface to the second interface if it is identified that the circuit level switch from the first interface to the second interface has occurred, wherein the means for performing the traffic level switch include means for automatically switching traffic arranged to be forwarded using the first interface onto the second interface without causing a process that implements an interior gateway routing protocol (IGP) to reconverge routing, and wherein the first interface is a primary interface and the second interface is a backup interface, the second interface having an associated IP loopback address.

16. The system of claim 15 wherein the means for performing the traffic level switch from the first interface to the second interface include: means for identifying an APS group that includes the first interface and the second interface, information associated with the APS group being provided by the IGP, wherein the first interface is identified as the primary interface in the APS group and the second interface is identified as the backup interface in the APS group.

17. The system of claim 16 wherein the IGP is an enhanced interior gateway routing protocol (EIGRP).

18. The system of claim 15 wherein the system is an add/drop multiplexer (ADM).

19. A system arranged to perform a switchover from a first interface to a second interface, the first interface and the second interface being associated with a router arrangement, the router arrangement having an automatic protection switching (APS) topology, the system comprising: a receiving interface for obtaining information relating to whether a circuit level switch from the first interface to the second interface has occurred; and a traffic switching interface, the traffic switching interface being arranged to perform a traffic level switch from the first interface to the second interface if the circuit level switch from the first interface to the second interface has occurred, wherein the traffic switching interface is further arranged to automatically switch traffic arranged to be forwarded using the first interface onto the second interface without causing a process that implements an interior gateway routing protocol (IGP) to reconverge routing, and wherein the first interface is a primary interface and the second interface is a backup interface, the second interface having an associated IP loopback address.

20. The system of claim 19 wherein the system is an add/drop multiplexer (ADM).

21. The system of claim 19 wherein the traffic switching interface is further arranged to identify an APS group that includes the first interface and the second interface, and wherein information associated with the APS group is provided by the IGP, the first interface being identified as the primary interface in the APS group and the second interface being identified as the backup interface in the APS group.

22. The system of claim 21 wherein the IGP is an enhanced interior gateway routing protocol (EIGRP).

23. A system for providing protection switching configuration information associated with a router arrangement to elements of a network such that a traffic level transparent switch may occur, the router arrangement having an automatic protection switching (APS) topology, the system comprising: a first arrangement that identifies a first interface and a second interface of the router arrangement as an APS group; a second arrangement that provides information regarding the APS group to a process that implements an enhanced interior gateway routing protocol (EIGRP), wherein the second arrangement identifies the first interface as a primary interface and identifies the second interface as a backup interface that is arranged to protect the primary interface, and wherein the information regarding the APS group further includes an IP loopback address associated with the second interface; and a third arrangement that performs a traffic level switch from the first interface onto the second interface without causing a process that implements an interior gateway routing protocol (IGP) to reconverge routing.

24. The system of claim 23 wherein the router arrangement is a single chassis, and the first interface is associated with a first router and the second interface is associated with a second router.

25. The system of claim 24 wherein the router arrangement includes an internal registry.

26. The system of claim 24 wherein the router arrangement further includes an internal registry, wherein the information is available in the internal registry.

* * * * *